(12) United States Patent
Ochoa

(10) Patent No.: US 8,496,218 B2
(45) Date of Patent: Jul. 30, 2013

(54) DISPLAY MONITOR GUIDE

(75) Inventor: Francisco Javier Ochoa, Cudahy, CA (US)

(73) Assignee: Alcon Research, Ltd., Fort Worth, TX (US)

( * ) Notice: Subject to any disclaimer, the term of this patent is extended or adjusted under 35 U.S.C. 154(b) by 90 days.

(21) Appl. No.: 13/155,559

(22) Filed: Jun. 8, 2011

(65) Prior Publication Data

US 2012/0314343 A1  Dec. 13, 2012

(51) Int. Cl.
*A47G 29/00* (2006.01)

(52) U.S. Cl.
USPC ..................... 248/372.1; 248/276.1

(58) Field of Classification Search
USPC ............... 248/917–923, 371, 372.1, 276.1, 248/278.1, 206.5; 361/679.01, 679.02, 679.21, 361/679.22
See application file for complete search history.

(56) References Cited

U.S. PATENT DOCUMENTS

| D325,086 | S | 3/1992 | Charles et al. | |
|---|---|---|---|---|
| 6,135,411 | A * | 10/2000 | Shirasawa | 248/349.1 |
| 6,161,806 | A * | 12/2000 | Crosson | 248/118.3 |
| D447,567 | S | 9/2001 | Murphy et al. | |
| D467,001 | S | 12/2002 | Buczek et al. | |
| 6,736,360 | B1 | 5/2004 | Buczek | |
| 6,869,056 | B2 * | 3/2005 | Tsukuda | 248/371 |
| D550,362 | S | 9/2007 | Olivera et al. | |
| 7,461,825 | B2 | 12/2008 | Olivera et al. | |
| 7,626,026 | B2 * | 12/2009 | Searcey et al. | 546/81 |
| 7,630,193 | B2 | 12/2009 | Ledbetter et al. | |
| 7,770,856 | B2 * | 8/2010 | Depay | 248/284.1 |
| 2008/0001866 | A1 | 1/2008 | Martin | |
| 2008/0033404 | A1 | 2/2008 | Romoda et al. | |
| 2008/0123264 | A1 | 5/2008 | Romoda et al. | |
| 2008/0132786 | A1 | 6/2008 | Asai et al. | |
| 2008/0215982 | A1 | 9/2008 | Washburn et al. | |
| 2010/0039380 | A1 | 2/2010 | Lanier | |

* cited by examiner

*Primary Examiner* — Nkeisha Smith
(74) *Attorney, Agent, or Firm* — Russell Henrichs

(57) ABSTRACT

In some embodiments, a display mounting system may include a display monitor coupled to a display arm that is mounted relative to a guide track. The display arm may be configured to contact the guide track though a track follower. The guide track may have an arc with a height that varies relative to a yaw position along the arc. In some embodiments, the track follower may be configured to move in contact with the arc of the guide track in a yaw direction and movement of the track follower in the yaw direction along the guide track may result in a change in pitch of the display arm. In some embodiments, the arc of the guide track may include a point for a stowed position of the display arm and a second point for a deployed position of the display arm.

19 Claims, 6 Drawing Sheets

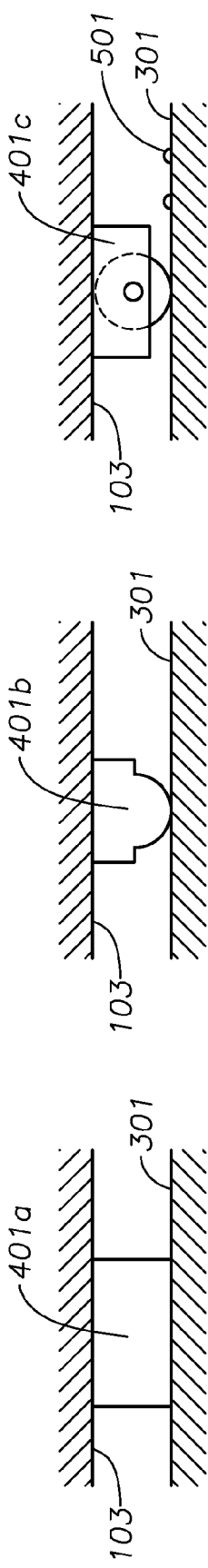

DISPLAY MONITOR GUIDE

FIELD OF THE INVENTION

The present invention generally pertains to displays. More particularly, but not by way of limitation, the present invention pertains to positioning systems for displays.

DESCRIPTION OF THE RELATED ART

Display monitors may be used on various types of machines to provide information to a user about the machine. Some display monitors also include touch screen interfaces that are capable of receiving information from the user for use in controlling the machine. Proper positioning of the display monitor may facilitate user access during machine operation. Moving the display monitor into a stowed position may serve to protect the display monitor when not in use.

SUMMARY

In some embodiments, a display mounting system may include a display monitor coupled to a display arm that is mounted to a working surface relative to a guide track (e.g., the guide track and display arm may both be coupled to a surgical console). The display arm may be configured to contact the guide track though a track follower. The guide track may have an arc with a height that varies relative to a yaw position along the arc. In some embodiments, the track follower may be configured to move in contact with the arc of the guide track in a yaw direction and movement of the track follower in the yaw direction along the guide track may result in a change in pitch of the display arm. In some embodiments, the arc of the guide track may include a point for a stowed position of the display arm and a second point for a deployed position of the display arm. For example, the deployed position of the display arm may be approximately 180 degrees of yaw from the stowed position of the display arm and approximately 90 degrees of pitch from the stowed position of the display arm. In some embodiments, the display arm may be movable along the guide track from the stowed position to the deployed position through a single user provide motion. In some embodiments, the track follower may contact the guide track through a wheel or spherical roller. In some embodiments, the track follower or guide track may include a motor configured to rotate the wheel or spherical roller to move the display arm. In some embodiments, the guide track may include one or more protrusions or indentations along the guide track to provide tactile feedback through the track follower as the track follower moves in contact with the guide track.

BRIEF DESCRIPTION OF THE DRAWINGS

For a more complete understanding of the present invention, reference is made to the following description taken in conjunction with the accompanying drawings in which:

FIGS. 5a-e illustrate configurations of the track follower, according to various embodiments.

It is to be understood that both the foregoing general description and the following detailed description are exemplary and explanatory only and are intended to provide a further explanation of the present invention as claimed.

DETAILED DESCRIPTION OF THE EMBODIMENTS

Figure 1A:
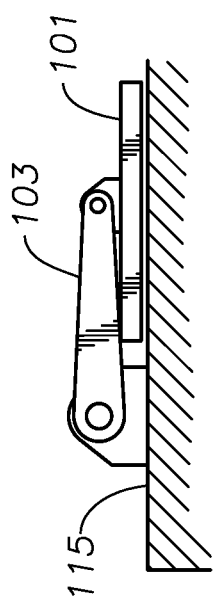
FIGS. 1a-c illustrate a display monitor mounting system.
Figure 1B:
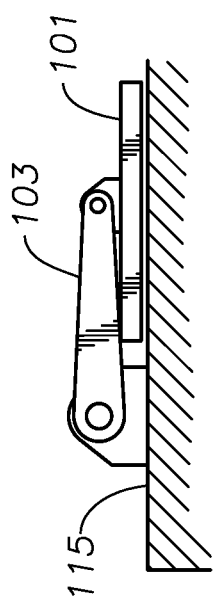
Figure 1C:
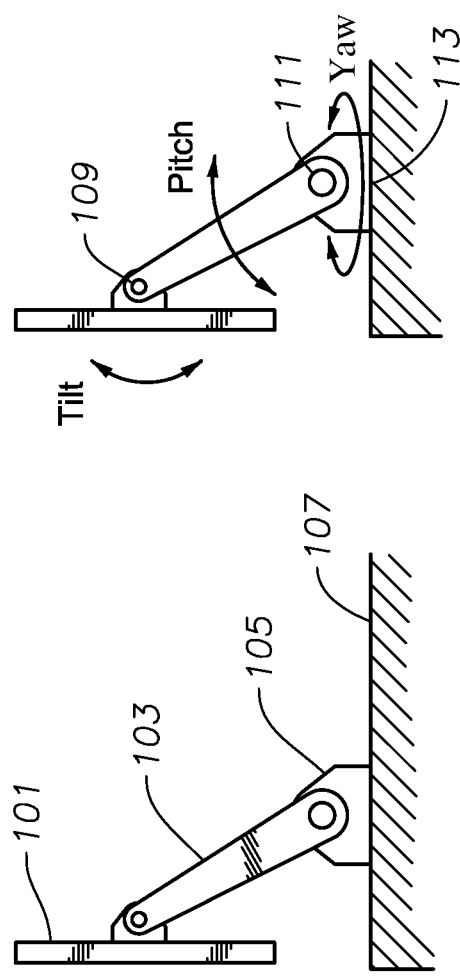
Figure 2A:
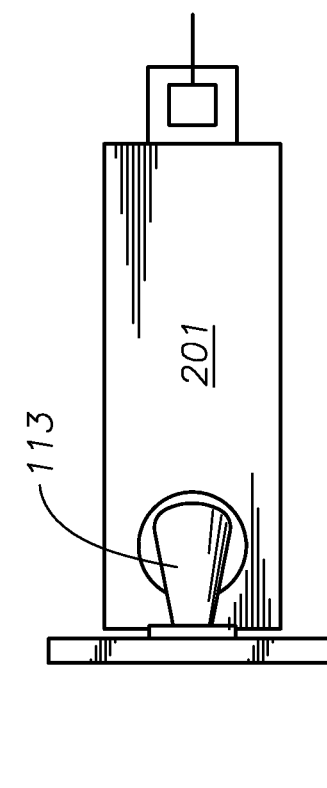
FIGS. 2a-b illustrate a display monitor mounted to the top of a surgical console.
Figure 2B:
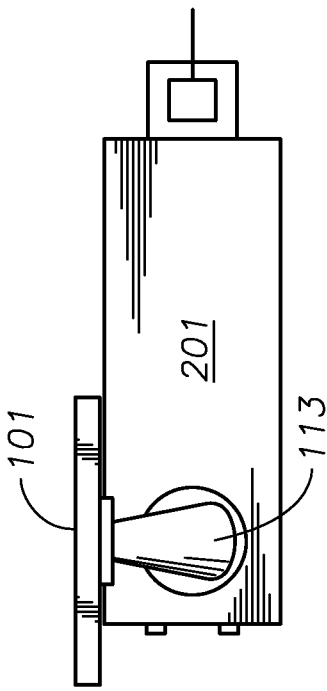

FIGS. 1a-c illustrate a display monitor mounting system. In some embodiments, a display monitor 101 (e.g., an LCD (liquid crystal display) monitor, plasma monitor, etc.) may be mounted to a mounting surface 107 through a display arm 103 and hub 105. The hub 105 may be used to mount the display arm 103 to the mounting surface 107. As seen in FIG. 1b, various pivot points (e.g., monitor pivot 109, display arm pivot 111, and hub pivot 113) allow the display monitor system to be moved along several different axis. For example, the display monitor 101 may tilt around pivot point 109, pitch around pivot point 111, and yaw around pivot point 113). Other pivot point configurations are also contemplated. For example, the hub may include a ball in socket pivot point that allows tilt, pitch, and yaw through a single pivot point. FIGS. 1a-b illustrate the display monitor 101 in a deployed configuration while FIG. 1c illustrates the display monitor 101 in a stowed configuration with the display monitor 101 lying flat along a work surface 115. FIGS. 2a-b illustrate the display monitor 101 mounted to the top of a surgical console 201. In some embodiments, the display monitor 101 may be positioned close to an edge of the top of the surgical console 201 to allow for adequate space behind the display monitor 101 for placing the display monitor 101 in the stowed configuration. Further, in some embodiments, it may be desirable for the display monitor 101 not to hang past a front edge of the surgical console when the display arm 103 is fully deployed. Other mounting locations for the display monitor 101 are also contemplated (e.g., in a central portion or near a back edge portion of the surgical console 201).

In some embodiments, the display monitor 101 may yaw around pivot point 113 to be viewed from different sides of the surgical console 201. In some embodiments, the display monitor 101 may display information about a surgical procedure and/or receive inputs through a graphical user interface (e.g., using a touch screen interface on the display monitor 101).

Figure 3:
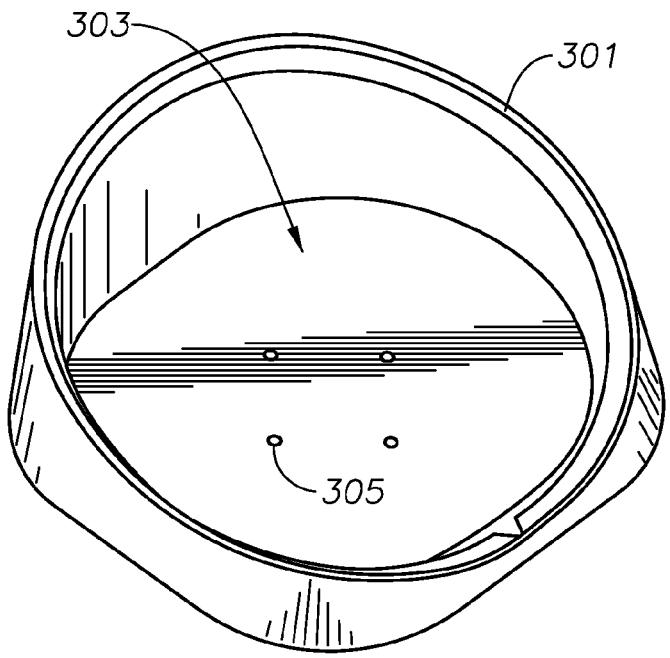
FIG. 3 illustrates a guide track for the display monitor, according to an embodiment.

FIG. 3 illustrates a guide track 301 for the display monitor 101, according to an embodiment. In some embodiments, the guide track 301 may include a three-dimensional track surface along an upper rim of the guide track 301. In some embodiments, the guide track 301 may be molded out of a rigid material such as steel or plastic. Other materials/manufacturing processes are also contemplated (e.g., machined aluminum). A guide track interior 303 may include fastening points 305 (such as holes to receives screws) to allow the hub 105 of the display monitor 101 to be mounted relative to the guide track 301. Other fastening mechanisms are also contemplated (e.g., adhesive, rivets, welds, solder, etc).

Figure 4:
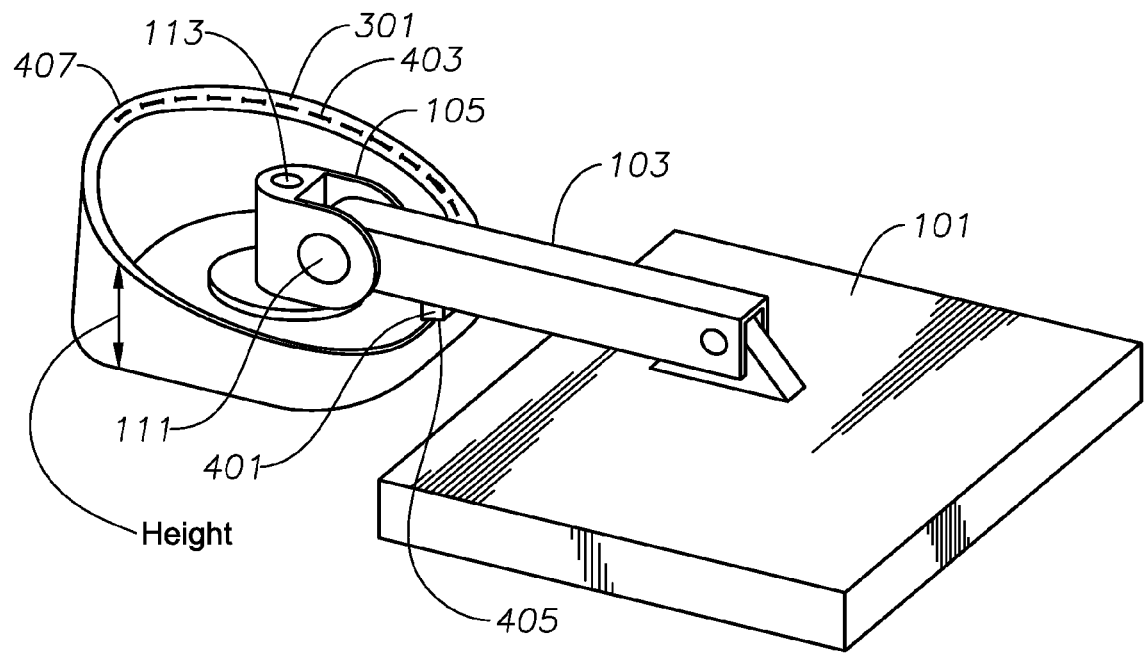
FIG. 4 illustrates a display monitor and guide track, according to an embodiment.

FIG. 4 illustrates the display monitor 101 and guide track 301, according to an embodiment. The display arm 103 may contact the guide track 301 through a track follower 401. For example, the weight of the display arm 103 may provide a downward force on the track follower 401 to keep the track follower 401 in contact with the guide track 301. In some embodiments, a user's pushing motion may include a downward force element that may also act to keep the track follower 401 in contact with the guide track 301. The track follower 401 may also be movably coupled to the guide track 301.

In some embodiments, the guide track 301 may guide the pitch of the display arm 103 (through contact with the track follower 401) as the display arm 103 yaws. For example, as the display arm 103 yaws from approximately 0 degrees (in a stowed configuration) to approximately 180 degrees (in a fully deployed position), the pitch of the display arm 103 may be increased from approximately 0 degrees to approximately 90 degrees. In some embodiments, the guide track 301 slope may proportionally increase in pitch as the display arm 103 is pushed/pulled along in a yaw direction along the guide track 301. In some embodiments, the arc 403 may be dimensioned such that the track follower 401 stays in contact with the guide track 301 as the display arm 103 yaws from its initial stowed position to its fully deployed position. For example, the guide track 301 may include an arc 403 (e.g., as part of a circular track) that may increase in height from a stow point 405 on the arc 403 to the deployment point 407 of the arc (which may be positioned approximately 180 degrees along the arc 403 from the stow point). Other arc configurations are also contemplated. For example, a radial arc of 90 degrees may separate the stow point 405 and the deployment point 407.

FIGS. 5a-e illustrate cross-sections of various configurations of the track follower 401, according to several embodiments. The track follower 401 may be an extension of the display arm 103 or may be a separate device that is coupled to the display arm 103 (e.g., through adhesive, welding, fasteners, etc). As seen in FIGS. 5a-d, the track follower 401 may facilitate sliding of the display arm 103 along the guide track 301. For example, as seen in FIG. 5a, the track follower 401a may include a smooth material (such as a smooth plastic rod) that slides along the guide track 301. As seen in FIG. 5b, the track follower 401b may include a rounded profile to facilitate sliding along the guide track 301. In some embodiments, the track follower 401c (and/or guide track 301) may include a moving part such as a wheel (e.g., as seen in FIG. 5c), a spherical roller (such as a ball bearing) or a series of wheels/spherical rollers (e.g., as seen in FIG. 5d). Other track follower/guide track configurations are also possible to facilitate sliding of the track follower 401 along the guide track 301. For example, as seen in FIG. 5e, the track follower 401e may be internal to the display arm 103. In some embodiments, the track follower 401 may move along a top most edge of the guide track 301. In some embodiments, the top of the guide track 301 may be slanted and the track follower 401 may contact the slanted edge of the guide track 301 (e.g., below a top most edge of the guide track 301). Other contact locations are also contemplated.

In some embodiments, the guide track 301 and/or track follower 401 may provide tactile feedback as the display arm 103 moves along the guide track 301 (e.g., through protrusions 501). Other tactile feedback is also contemplated (e.g., through indentations in the guide track 301). The tactile feedback may allow users to repeat desired positioning of the display monitor 101 (e.g., in positions defined between two bumps 501 at a particularly desired yaw/pitch). In some embodiments, the protrusions/indentations may be placed at specific yaw/pitch positions (e.g., at the stowed position, at the fully deployed position, at a halfway position, etc). Resistance in one or more of the pivot points may allow the display arm 103 to hold position along various points on the guide track path.

Figure 5F:
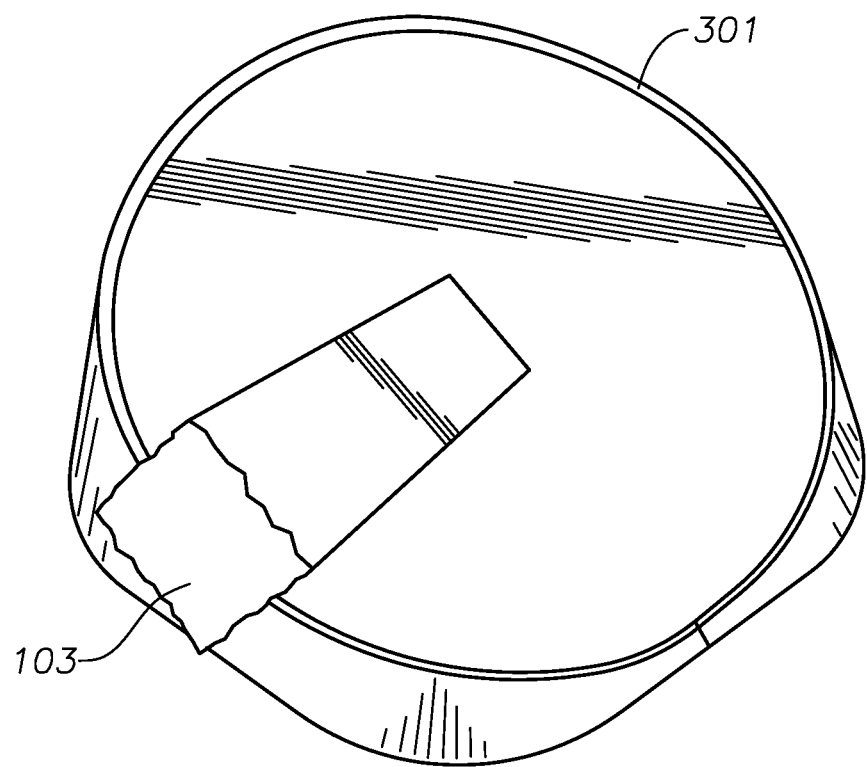
FIG. 5f illustrates a configuration of a solid interior guide track, according to various embodiments.

While FIGS. 5a-e show a thin-walled guide track 301, as seen in FIG. 5f, the guide track 301 may include a solid interior that the display arm 103 may contact directly or through a track follower 401 between the display arm 103 and the guide track 301.

Figure 6A:
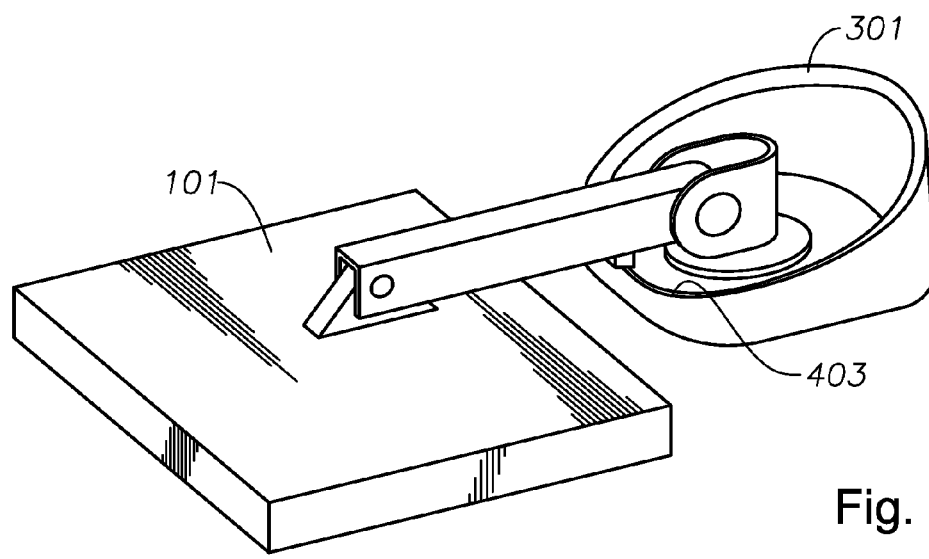
FIGS. 6a-d illustrate various positions of the display monitor and guide track, according to an embodiment.
Figure 6B:
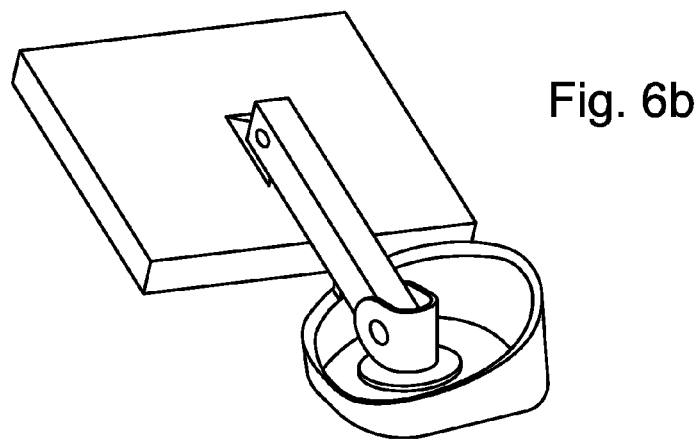
Figure 6C:
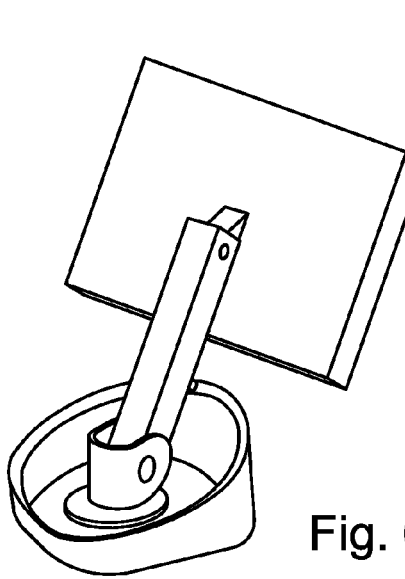
Figure 6D:
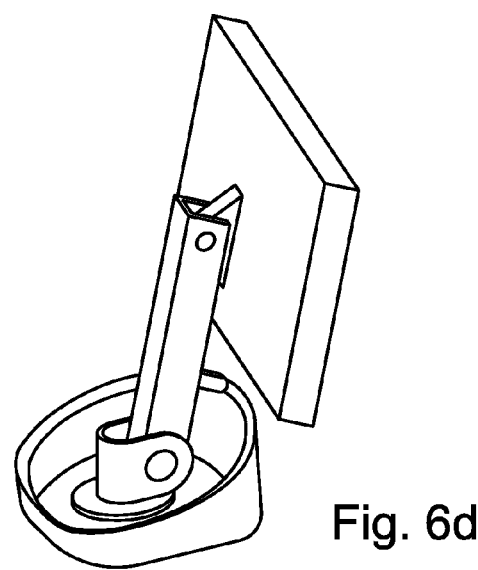

FIGS. 6a-d illustrate various positions of the display monitor 101 and guide track 301, according to an embodiment. As seen in FIG. 6a, the display arm 103 may rest on the guide track 301 at a stow position of 0 degrees yaw by 0 degrees pitch. As the display arm 103 moves along the guide track 301, the display arm 103 may travel through a series of points along the guide track arc. For example, as seen in FIG. 6b, the display arm may travel through a second position of 80 degrees yaw at 40 degrees pitch and a third position of 140 degrees yaw at 70 degrees pitch. As seen in FIG. 6d, the fully deployed position may include a position of 180 degrees yaw at 90 degrees pitch (other fully deployed coordinates are also possible). In some embodiments, the display monitor 101 may be further adjusted. For example, the display arm 103/track follower 401 may be lifted out of contact with the guide track 301 to position the display arm 103 at various angles with respect to the user (and as permitted by the range of the monitor pivot 109, display arm pivot 111, hub pivot 113 and guide track 301). In some embodiments, the display arm 103 may be adjusted (e.g., at various yaw positions) between a lower pitch limit (when the track follower 401 is in contact with the guide track 301) and an upper pitch limit (e.g., vertical).

Figure 7:
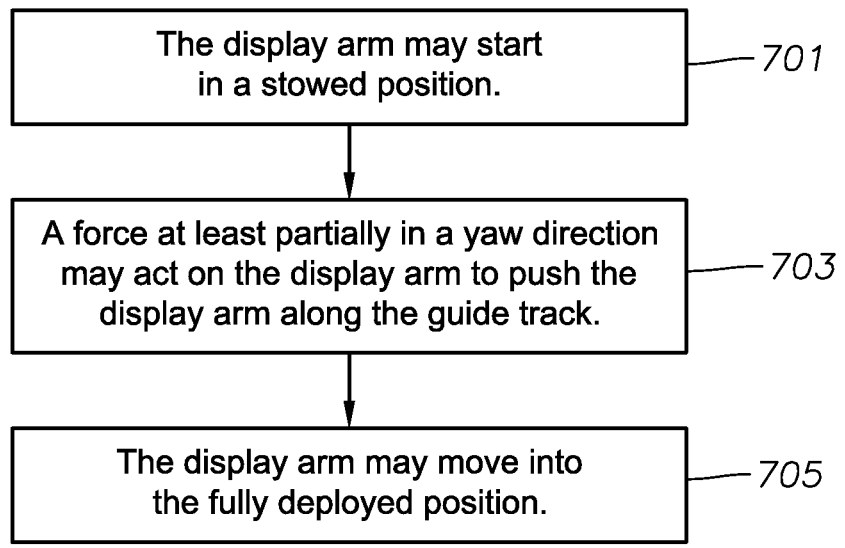
FIG. 7 illustrates a flowchart of method for deploying the display monitor using the guide track, according to an embodiment.
Figure 8:
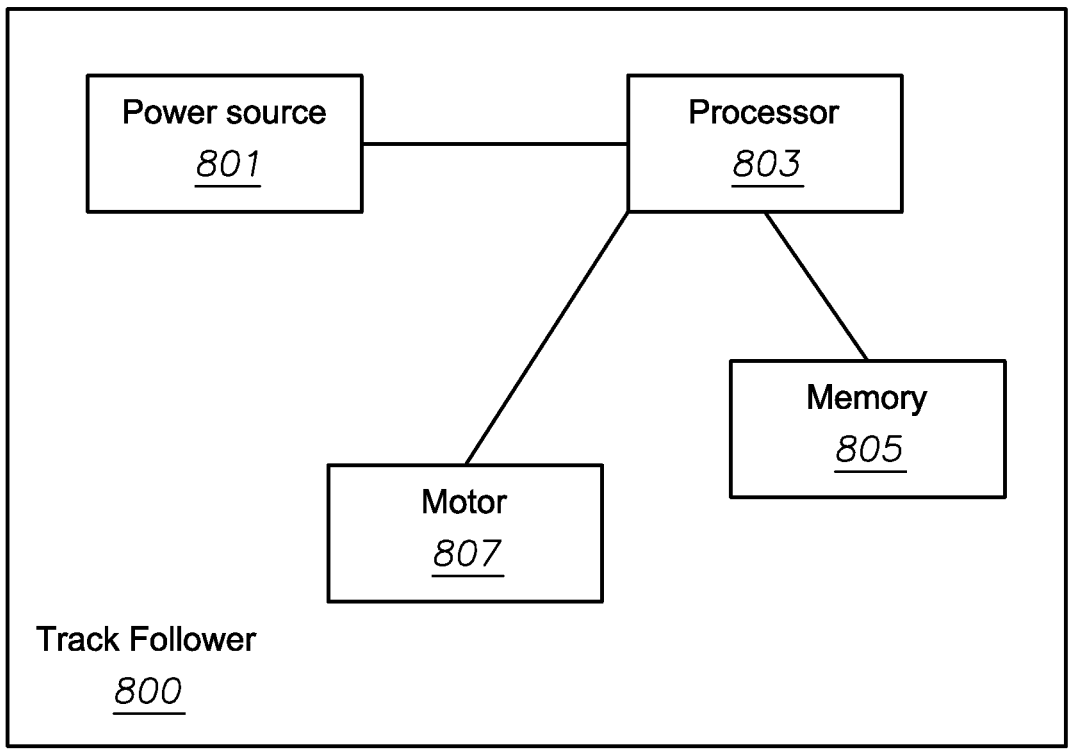
FIG. 8 illustrates a block diagram of an automated guidance system for the track follower, according to an embodiment.

FIG. 7 illustrates a flowchart of method for deploying the display monitor 101 using the guide track 301, according to an embodiment. The elements provided in the flowchart are illustrative only. Various provided elements may be omitted, additional elements may be added, and/or various elements may be performed in a different order than provided below.

At 701, the display arm 103 may start in a stowed position (e.g., as seen in FIG. 6a). In some embodiments, the stowed position may include the display monitor 101 positioned facedown as seen in FIG. 4. Other stowed positions are also possible (e.g., the display monitor 101 may be stowed at an angle or in a position under a top cover of the working surface 115).

At 703, a force at least partially in a yaw direction may act on the display arm 103 to push the display arm 103 along the guide track 301. In some embodiments, the track follower 401 may facilitate sliding of the display arm 103 along the guide track 301. In some embodiments, the guide track 301 may constrain mobility of the display monitor 101 by acting as a barrier to the pitching motion of the display arm 103. In some embodiments, the barrier may be tuned so that the pitch range is a function of the yaw position. The guide track 301 may be shaped such that the pitch range is constrained in a continuous manner, e.g., to prevent collision points between the display monitor 101 and the work surface 115. In some embodiments, the guide track 301 may provide a predetermined pitch position for several (or all) yaw positions while also limiting the minimum pitch as needed.

At 705, the display arm 103 may move into the fully deployed position (e.g., as seen in FIG. 6d). In some embodiments, the guide track 301/track follower 401 interaction may provide a single step process to transition the display monitor 101 from a stowed to deployed position. For example, deployment of the display monitor 101 from the stowed position may require only a single user provided force in the yaw direction.

In some embodiments, a user may manually push the display arm 103. In some embodiments, the track follower 800 (or guide track 301) may include a power source and guidance system (e.g., including a processor 803) to move the display arm 103 (e.g., by rotating a wheel (as seen in FIG. 5c) through a motor 807). The guidance system may include one or more processors 803 which may include single processing devices or a plurality of processing devices. Such a processing device may be a microprocessor, controller (which may be a microcontroller), digital signal processor, microcomputer, central processing unit, field programmable gate array, programmable logic device, state machine, logic circuitry, control circuitry, analog circuitry, digital circuitry, and/or any device that manipulates signals (analog and/or digital) based on operational instructions. The memory 805 coupled to and/or embedded in the processors may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processors implement one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 805 may store, and the processor 803 may execute, operational instructions corresponding to at least some of the elements illustrated and described in association with the figures.

As used herein, the terms "substantially" and "approximately" provide an industry-accepted tolerance to its corresponding term. This tolerance may range from, for example, less than one percent to twenty percent. As used herein, the term "coupled" may include direct coupling and indirect coupling via another component or element. Various modifications may be made to the presented embodiments by a person of ordinary skill in the art. Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof

What is claimed is:

1. A system, comprising:
   a fixed guide track comprising an arc with a height that varies relative to a yaw position along the arc;
   a display monitor mounted to a display arm, wherein the display arm is mounted to the display monitor on one end and to a hub on an opposing end,
   wherein the hub is mounted inside the guide track and has a first and second pivot point such that the hub is configured to rotate on the first pivot point on a plane inside the guide track and configured to allow the display arm to pivot on the second pivot point at a non-zero angle relative to the plane of rotation; and wherein the display arm is configured to contact the guide track through a track follower on the display arm between the two ends of the display arm;
   wherein the track follower is configured to move in contact with the arc of the guide track in a yaw direction as the hub rotates on the plane inside the fixed guide track and wherein movement of the track follower in a yaw direction along the guide track results in a change in pitch of the display arm as the display arm pivots on the second pivot point.

2. The system of claim 1, wherein the guide track comprises an arc comprising a point for a stowed position of the display arm and a second point for a deployed position of the display arm.

3. The system of claim 2, wherein the deployed position of the display anal is approximately 180 degrees of yaw from the stowed position of the display arm and approximately 90 degrees of pitch from the stowed position of the display arm.

4. The system of claim 2, wherein the display arm is movable along the guide track from the stowed position to the deployed position through a single user provide motion.

5. The system of claim 1, wherein the track follower contacts the guide track through a wheel or spherical roller.

6. The system of claim 5, wherein the track follower or guide track comprises a motor configured to rotate the wheel or spherical roller to move the display arm.

7. The system of claim 1, wherein the guide track comprises one or more protrusions or indentations along the guide track to provide tactile feedback through the track follower as the track follower moves in contact with the guide track.

8. The system of claim 1, wherein the guide track and the display arm are coupled to a surgical console.

9. The system of claim 1, wherein the hub is configured to allow the display arm to move to a position out of contact with the guide track and be held by the hub in the position out of contact with the guide track.

10. The system of claim 1, wherein the guide track substantially circumscribes the hub and wherein the first and second pivot points on the hub are oriented at approximately 90 degrees relative to each other.

11. A method, comprising:
    providing a display monitor mounted to a display arm, wherein the display arm is mounted to the display monitor on one end and to a hub on an opposing end, wherein the hub is mounted inside the guide track and has a first and second pivot point such that the but is configured to rotate on the first pivot point on plane inside a guide track and configured to allow the display arm to pivot on the second pivot point at a non-zero angle relative to the plane of rotation; and wherein the display aini is configured to contact the guide track through a track follower in contact with the display arm between the two ends of the display arm, wherein the guide track comprises an arc with a height that varies relative to a yaw position along the arc;
    applying a force at least partially in a yaw direction on the display arm to push the display arm along the guide track, wherein the track follower is configured to move in contact with the arc of the guide track in the yaw direction and wherein movement of the track follower in a yaw direction along the guide track results in a change in pitch of the display arm.

12. The method of claim 11, wherein the guide track comprises an arc comprising a point for a stowed position of the display arm and a second point for a deployed position of the display arm.

13. The method of claim 12, wherein the deployed position of the display arm is approximately 180 degrees of yaw from the stowed position of the display arm and approximately 90 degrees of pitch from the stowed position of the display arm.

14. The method of claim 12, wherein the display arm is movable along the guide track from the stowed position to the deployed position through a single user provide motion.

15. The method of claim 11, wherein the track follower contacts the guide track through a wheel or spherical roller.

16. The method of claim 15, wherein the track follower or guide track comprises a motor configured to rotate the wheel or spherical roller to move the display arm.

17. The method of claim 11, wherein the guide track comprises one or more protrusions or indentations along the guide track to provide tactile feedback through the track follower as the track follower moves in contact with the guide track.

18. The method of claim 11, wherein the guide track and the display arm are coupled to a surgical console.

19. The method of claim 11, further comprising moving the display arm to a position out of contact with the guide track and holding the display arm, through the hub, out of contact with the guide track.

* * * * *